US006609973B1

(12) United States Patent
Weiss

(10) Patent No.: US 6,609,973 B1
(45) Date of Patent: Aug. 26, 2003

(54) GAMING DEVICE WITH BINGO BONUS GAME

(75) Inventor: Steven A. Weiss, Las Vegas, NV (US)

(73) Assignee: Casino Data Systems, Las Vegas, NV (US)

( * ) Notice: Subject to any disclaimer, the term of this patent is extended or adjusted under 35 U.S.C. 154(b) by 0 days.

(21) Appl. No.: 09/688,057

(22) Filed: Oct. 13, 2000

(51) Int. Cl.[7] ................................................ A63F 13/00
(52) U.S. Cl. .............................. 463/20; 463/19; 463/25
(58) Field of Search .......................... 463/16–20, 22–25

(56) References Cited

U.S. PATENT DOCUMENTS 5,393,057 A * 2/1995 Marnell, II .................. 463/20
5,613,910 A * 3/1997 Hamano ...................... 463/19
5,624,119 A * 4/1997 Leake ......................... 463/19
5,639,088 A * 6/1997 Schneider et al. ............ 463/13
5,639,089 A * 6/1997 Matsumoto et al. .......... 463/19
5,647,798 A * 7/1997 Falciglia ...................... 463/19
6,012,982 A * 1/2000 Piechowiak et al. .......... 463/16
6,139,013 A * 10/2000 Pierce et al. .................. 463/20
6,309,300 B1 * 10/2001 Glavich ........................ 463/26
6,338,678 B1 * 1/2002 Seelig et al. ............. 273/138.2

* cited by examiner

*Primary Examiner*—John M Hotaling, II
(74) *Attorney, Agent, or Firm*—Bernhard Kreten

(57) ABSTRACT

A method and device for gaming, in which a primary game is played toward a winning outcome, and in which a possible bonus game is triggered by a particular outcome or outcomes on the primary game. The bonus game differs from the primary game. These devices may utilize "progressive" awards, allowing players to compete against each other for larger awards. Additionally, multiple levels of progressive awards may be offered, with each level based on the amount of the initial wager.

17 Claims, 3 Drawing Sheets

GAMING DEVICE WITH BINGO BONUS GAME

FIELD OF THE INVENTION

The following invention is generally related to instrumentalities and methodologies in gaming devices. More specifically, the instant invention is directed to a gaming device having a winning outcome in which the player is rewarded, and a second triggering outcome allowing the player to participate in a subsequent gaming event. Such a gaming device may be utilized with multiple levels of “progressive” awards, with the level of the available award based on the amount of the initial wager.

As a consequence, awarding of credits may be defined by a plurality of levels of progressive awards, wherein each level is dependent on the number of gaming propositions occurring simultaneously.

BACKGROUND OF THE INVENTION

The primary purpose of playing any game is to win the game. While a player may initially find enjoyment in trying to win a particular game, tedium sets in if no further stimulus is offered to entertain the player. Accordingly, several games have been developed that offer a “bonus” game for attaining a particular outcome, allowing the player the prospect of engaging in a different gaming proposition. Many bonus games, however, simply consist of playing a revised version of the initial game, which does nothing to relieve tedium produced by the initial game. Additionally, “progressive” award games are offered by some developers, offering awards dependent on the number of players engaged in the participating machines. These add the excitement of obtaining a larger award, but are available only to players who employ maximum wagers. Such propositions are not stimulating to players who choose to play consistently, but with lower stakes.

SUMMARY OF THE INVENTION

The present invention is distinguishable over the prior art in a multiplicity of ways. For example, the instant invention rewards a player for winning outcomes on a primary game, and affords an opportunity to engage in a completely different type of gaming proposition.

Further, the instant invention allows a player to compete against other players for a larger award, which is dependent on the number of other players present.

Further, the instant invention allows a player to participate in these competitive, “progressive”-type awards even if a maximum wager is not enabled.

OBJECTS OF THE INVENTION

Accordingly, it is a primary object of the present invention to provide a new and novel device and method for gaming, in which a player has the opportunity to play a secondary game for more chances at success.

It is a further object of the present invention to provide a device and method as characterized above which provides a player with the prospect of engaging in different types of gaining propositions in one gaming session.

It is a further object of the present invention to provide a device and method as characterized above to offer a player the opportunity to effectively compete against other players for a larger award.

It is a further object of the present invention to provide a device and method as characterized above that allows participation in “progressive” awards even if the player does not have a maximum wager enabled.

Viewed from a first vantage point, it is an object of the present invention to provide a method for gaming, the steps including: receiving a wager to enable the gaming device, enabling a primary display, displaying at least one outcome leading to a bonus event, wherein the bonus event is defined by a randomly-numbered playfield, oriented in an row-and-column (RXC) matrix, randomly-generated indicia, first comparison means to determine whether said randomly-generated indicia match any positions on said randomly-numbered playfield, and second comparison means to determine whether said matched positions on said randomly-numbered playfield correspond to a winning outcome, and awarding credits if a winning outcome is attained.

Viewed from a second vantage point, it is an object of the present invention to provide a gaming device, comprising, in combination: a display, wagering means, a processor interposed between said display and said wagering means to initiate play of a primary game on said display upon activation of said wagering means, said display having at least one outcome which triggers a bonus event, wherein said bonus event is defined by a randomly-numbered playfield oriented in an row-and-column (RXC) matrix, randomly-generated indicia, first comparison means to determine whether said randomly-generated indicia match any positions on said randomly-numbered playfield, and second comparison means to determine whether said matched positions on said randomly-numbered playfield correspond to a winning outcome, and award means for awarding the player credits for winning outcomes attained.

These and other objects will be made manifest when considering the following detailed specification when taken in conjunction with the appended drawing figures.

DESCRIPTION OF PREFERRED EMBODIMENTS

Figure 2:
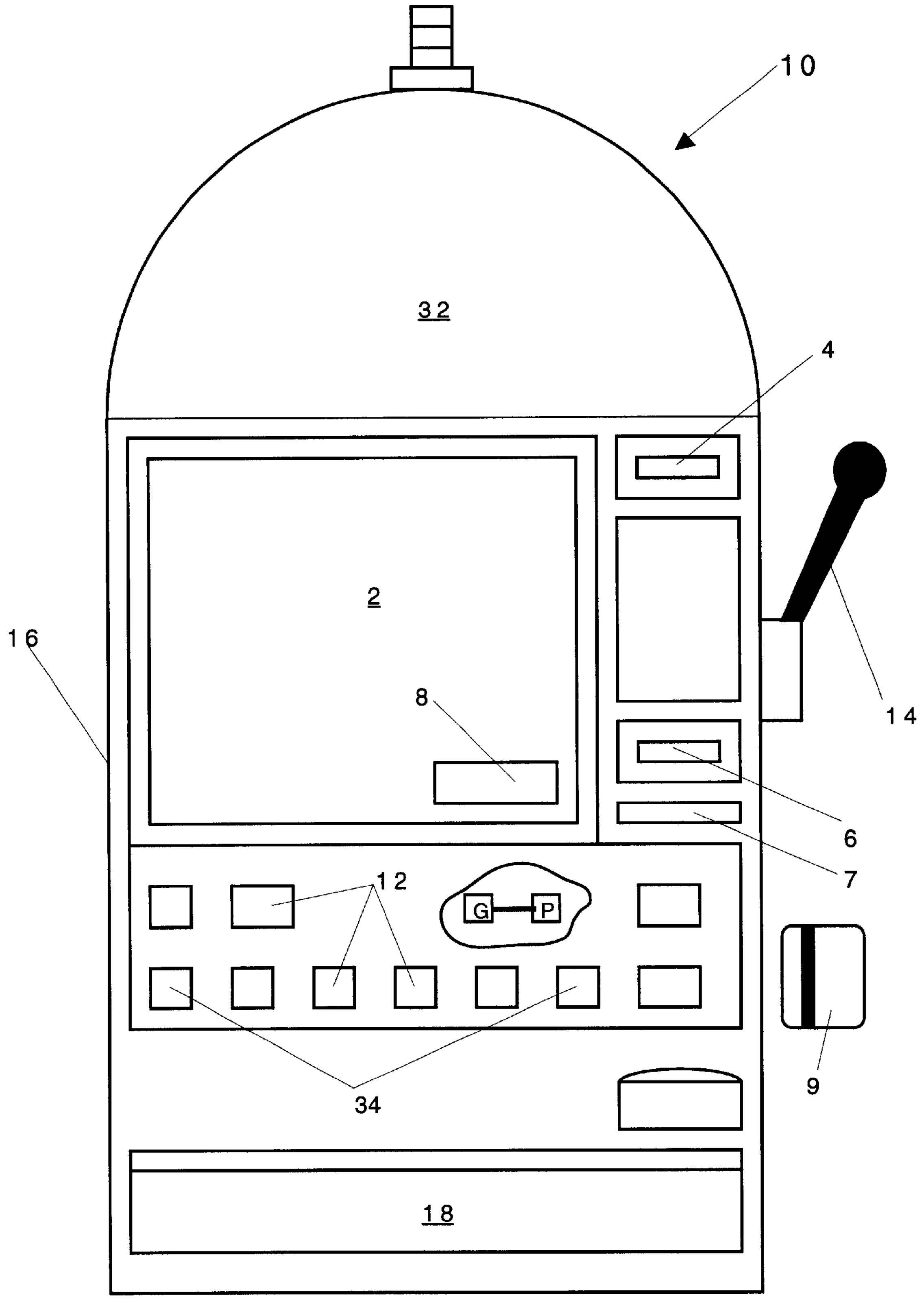
FIG. 2 is a depiction of the apparatus associated therewith.

Considering the drawings, wherein like reference numerals denote like parts throughout the various drawing figures, reference numeral 10 as shown in FIG. 2 is directed to the device according to the present invention.

In its essence, the device 10 includes a housing 16 which supports a visual display 2, preferably a video monitor, therewithin. The display 2 may include a window 8 for special messages or for incrementing counting of credits accumulated by the player. The device also includes an LED or other readout 4 for prompting the player and can provide similar verbiage as the window 8 or in lieu thereof, to stimulate the player. The device includes an inlet 6 for the reception therein for coins, currency or the like to auger in the inception of play. A plurality of decision-making buttons 12 are located on the face of the apparatus 10, preferable below the display 2 and a pull handle 14 can be used to initiate play as an alternative to supplement the decision-making buttons 12. A coin hopper 18 or other payment methods, i.e., ticket printers, may be included to effectuate an output of an award due the player. The device 10 may have a top portion 32 with a display thereon having a motif correlative with the game to be played and can include a paytable. A plurality of speakers 34 may be included on the device for aural interaction with the player. The apparatus also includes a processor P coordinating all functions and a random number generator G operatively coupled thereto for generating outcomes. A card 9, having a read/write instrumentality 17 thereon, registers with an input 7 on the device 10 to transfer credits and/or update player status.

The primary game is preferably a reel type game, well known in the art, with multiple pay lines, for example, 9, 15 or 25 pay lines.

Figure 3:
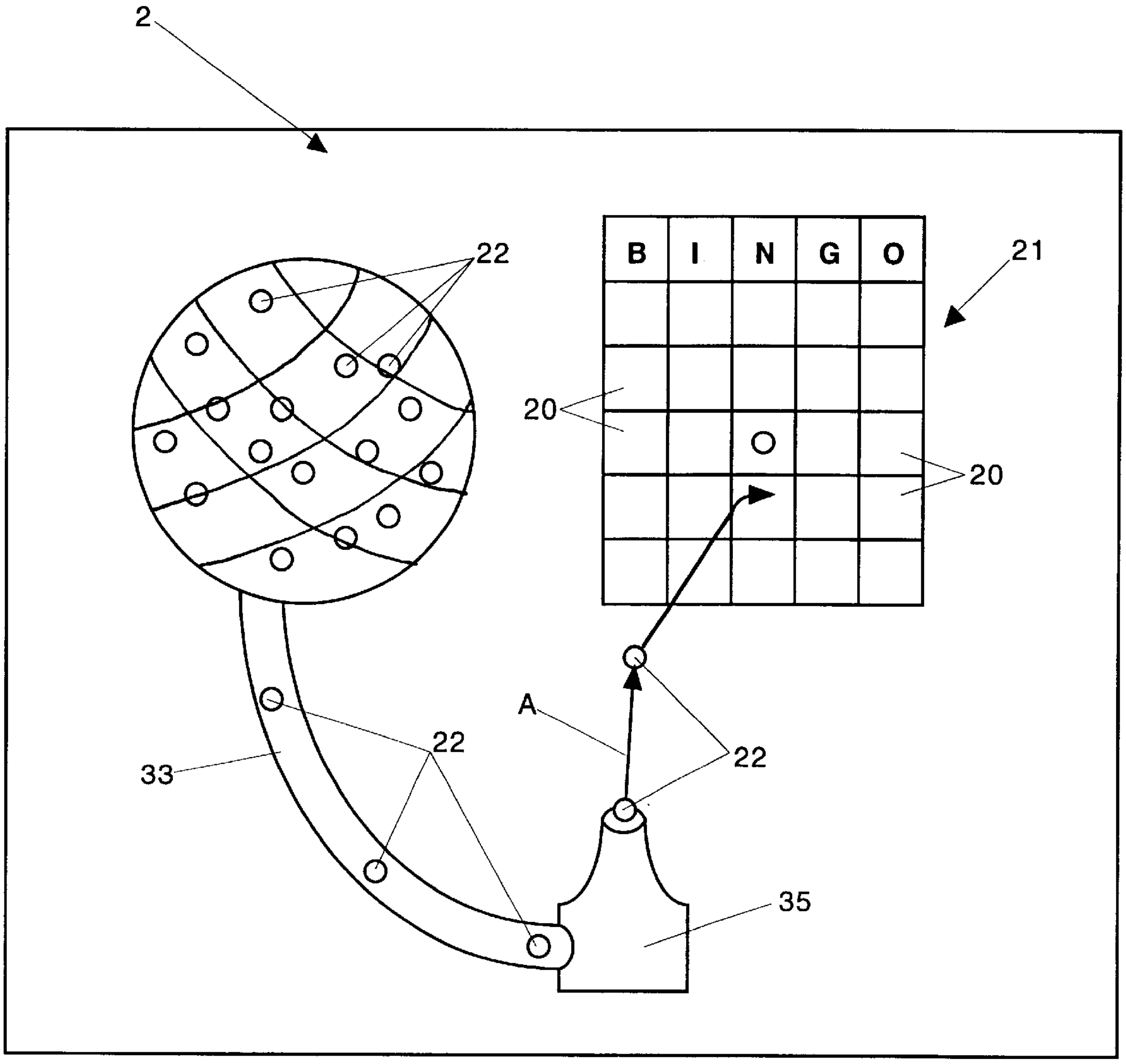
FIG. 3 is a depiction of a bonus event display, depicting a plurality of randomly-numbered positions in a row-and-column (RXC) matrix.

More specifically, and with reference to FIG. 3, greater details with respect to the video display 2 can be explored with respect to the bonus game. In the preferred embodiment, the display 2 features a plurality of randomly-numbered positions 20 in a row-and-column (RXC) matrix 21. Numbers for play by the device 22 are randomly generated for play on the matrix 21. Preferably, the matrix defines a 5×5 array, correlative of BINGO, and above row one depicts the letters "BINGO," defining with positions 20 an alphanumeric display.

Figure 1:
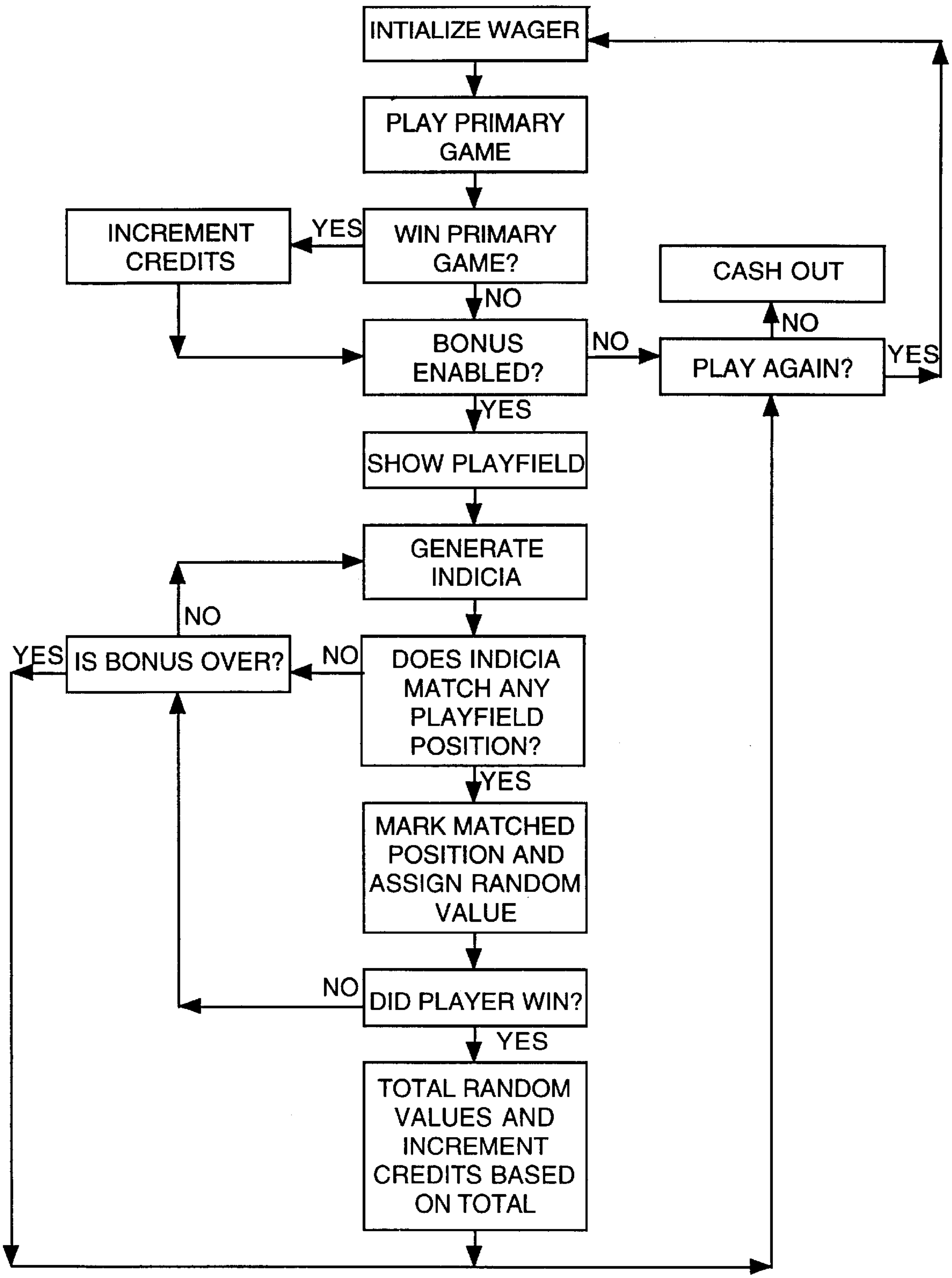
FIG. 1 is a flowchart of the methodology according to the present invention.

Referring to FIG. 1, the flow chart associated with the apparatus of FIGS. 2 and 3 can be explored. In a single-player embodiment, the player engages in gaming proposition for which rewards are given for specific outcomes according to a paytable. Regardless of whether a reward is given for the primary outcome, a specific triggering outcome, if obtained, will initiate a subsequent bonus game. The bonus game uses the display pictured in FIG. 3, on which a matrix 21 composed of randomly-numbered positions 20 is present. The center position "O" of the matrix 21 is assigned a high-value bonus amount, which is displayed. Randomly-generated numbers 22 escape from a globe shaped cage 31 and advance down an arcuate trackway 33 on the display 2. Each number is embodied as a bingo ball having a distinctive numeric or alphanumeric value. Each position 20 on the matrix 21 coincides with only one ball. A launcher 35 projects one ball at a time, for example, along trajectory "A" to its matching position. Thus, the balls 22 are compared to the numbers 20 on the matrix 21; if the numbers match, then that position appears bolded, highlighted, or "covered" on the matrix 21. In addition, each "covered" position is assigned a randomly-generated bonus amount. Randomly-generated numbers 22 continue to appear on the display 2 until a predetermined number of numbers have been generated, a line (e.g., row, column, diagonal) has been filled in, or until another preset event occurs, such as the expiration of time or predetermined number of wagers or balls.

The preferred embodiment contemplates a winning outcome of five covered positions along the same row, column or diagonal of the matrix 21. Alternatively, a winning outcome could consist of covering the four corners of the playfield or of restricting winning combinations to covering positions in only a row or only a column. If a player acquires a winning outcome, the bonus amounts corresponding to each of the covered spaces in that winning outcome are added together, producing a total bonus value. This total bonus value is multiplied by the player's initial wager to determine the player's ultimate award due from the bonus game. Thus, for example, if the player initially wagers two units per payline, the award derived from the bonus game is multiplied by two. If the player has not produced a winning outcome on the matrix 21 by the end of the game, the player loses the initial wager and has the option to play the primary game again or to quit and cash out.

The device can be utilized for tournament-style play, in which players may compete against each other to acquire a particular type of winning outcome. Such play may also utilize multiple "progressive" awards, with the differing amounts of the awards depending on the amount of the initial wager. That is, one progressive award would be available to players utilizing a maximum wager, while a progressive award of lower value would be available to players utilizing less than a maximum wager.

Thus, awarding of credits may be defined by a plurality of levels of progressive awards, wherein each level is dependent on the number of gaming propositions occurring simultaneously.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method for gaming, the steps including:

receiving a wager to enable the gaming device, enabling a primary display, displaying at least one outcome defined by first indicia and leading to a bonus event, wherein the bonus event is defined by a randomly-numbered playfield oriented in an row-and-column (RXC) matrix, randomly-generated second indicia distinct from said first indicia appearing as a cage containing plural said second indicia and subsequently launching said second indicia onto said playfield, first comparison means to determine whether said randomly-generated second indicia match any positions on said randomly-numbered playfield, and second comparison means to determine whether said matched positions on said randomly-numbered playfield correspond to a winning outcome, and awarding credits if a winning outcome is attained.

2. The method of claim 1 including assigning each of said matched positions a random award adjustment value to be used in said awarding of credits.

3. The method of claim 2 including correlating said awarding of credits with a combination of said randomly-assigned award adjustment values to be used in said awarding of credits.

4. The method of claim 3 including configuring said randomly-numbered playfield as a 5×5 matrix.

5. The method of claim 4 including not assigning the center position of said matrix a random number, but always considering it to be a matching position.

6. The method of claim 5 including pre-assigning the center position of said matrix a random award adjustment value to be used in said awarding of credits.

7. The method of claim 6 wherein said winning outcome consists of acquiring five of said matching positions across a row, column or diagonal of said matrix.

8. The method of claim 7 including awarding of credits by a plurality of levels of progressive awards, wherein each award level is dependent on success of a plurality of players simultaneously engaging in said bonus event.

9. A gaming device, comprising, in combination:

a display, wagering means, a processor interposed between said display and said wagering means to initiate play of a primary game on said display upon activation of said wagering means, said display having at least one outcome defined by first indicia which triggers a bonus event, wherein said bonus event is defined by a randomly-numbered playfield oriented in an row-and-column (RXC) matrix, randomly-generated second indicia distinct from said first indicia defined by a cage which releases said second indicia down an arctuate trackway and thence to a launcher, first comparison means to determine whether said randomly-generated second indicia match any positions on said randomly-numbered playfield, and second comparison means to determine whether said matched positions on said randomly-numbered playfield correspond to a winning outcome, and award means for awarding the player credits for winning outcomes attained.

10. The device of claim 9 wherein each of said matched positions are assigned a random award adjustment value to be used by said award means in said awarding of credits.

11. The device of claim 10 wherein said awarding of credits is correlated to a combination of said randomly-assigned award adjustment values to be used by said award means in said awarding of credits.

12. The device of claim 11 wherein said randomly-numbered playfield is a 5×5 matrix.

13. The device of claim 12 wherein the center position of said matrix is not assigned a random number, but is always considered to be a matching position.

14. The device of claim 13 wherein the center position of said matrix is pre-assigned a random award adjustment value to be used in said awarding of credits.

15. The device of claim 14 wherein said winning outcome consists of acquiring five of said matching positions across a row, column or diagonal of said matrix.

16. The device of claim 15 wherein said awarding of credits is defined by a plurality of levels of progressive awards, wherein each award level is dependent on success of a plurality of players simultaneously engaging in said bonus event.

17. The device of claim 16 wherein said second indicia are embodied as bingo balls and said launcher projects one ball at a time along a trajectory and thence to a matching position on said playfield.

* * * * *